US009101126B2

(12) United States Patent
Pinkston

(10) Patent No.: US 9,101,126 B2
(45) Date of Patent: Aug. 11, 2015

(54) REMOTE CONTROL GATE RELEASE FOR TRAP ENCLOSURE

(75) Inventor: Rodney Gene Pinkston, Cataula, GA (US)

(73) Assignee: Jager Pro, LLC, Cataula, GA (US)

( * ) Notice: Subject to any disclaimer, the term of this patent is extended or adjusted under 35 U.S.C. 154(b) by 493 days.

(21) Appl. No.: 13/004,747

(22) Filed: Jan. 11, 2011

(65) Prior Publication Data

US 2011/0167709 A1    Jul. 14, 2011

Related U.S. Application Data

(60) Provisional application No. 61/293,864, filed on Jan. 11, 2010.

(51) Int. Cl.
*A01M 23/02*  (2006.01)
*A01M 23/20*  (2006.01)
*A01M 31/00*  (2006.01)
*G03B 29/00*  (2006.01)

(52) U.S. Cl.
CPC ............. *A01M 23/20* (2013.01); *A01M 31/002* (2013.01); *G03B 29/00* (2013.01)

(58) Field of Classification Search
CPC ... A01M 31/002; G08B 25/008; G08B 15/00; G08B 13/19613; G08B 13/1436; G08B 21/22
USPC ............... 43/59, 61, 65; 340/541, 545.3, 567; 109/3; 119/51.02, 515, 840
See application file for complete search history.

(56) References Cited

U.S. PATENT DOCUMENTS

| | | | | | |
|---|---|---|---|---|---|
| 5,579,719 | A  | * | 12/1996 | Hoff et al. | 119/51.02 |
| 6,427,632 | B1 | * | 8/2002  | Horst et al. | 119/518 |
| 6,748,898 | B2 | * | 6/2004  | Ulman et al. | 119/57.92 |
| 8,166,916 | B2 | * | 5/2012  | Larose et al. | 119/51.02 |
| 8,210,128 | B1 | * | 7/2012  | Lato | 119/510 |
| 2007/0248219 | A1 | * | 10/2007 | Foster et al. | 379/102.06 |
| 2008/0048861 | A1 | * | 2/2008  | Naidoo et al. | 340/541 |
| 2009/0051484 | A1 |   | 2/2009  | Foster | 340/5.7 |
| 2009/0225166 | A1 | * | 9/2009  | Dronge | 348/155 |
| 2010/0064572 | A1 | * | 3/2010  | Kurachi | 43/61 |

OTHER PUBLICATIONS

U.S. Appl. No. 61/293,864, filed Jan. 11, 2010, Rodney Pinkston.
U.S. Appl. No. 61/030,884, filed Feb. 22, 2008, W. Dale Foster.
U.S. Appl. No. 60/956,830, filed Aug. 20, 2007, W. Dale Foster.
U.S. Appl. No. 60/743,710, filed Mar. 23, 2006, W. Dale Foster.

(Continued)

*Primary Examiner* — Rob Swiatek
(74) *Attorney, Agent, or Firm* — Ballard Spahr LLP

(57) ABSTRACT

A trap for capturing a plurality of animals. The trap can comprise an enclosure having an opening through which the at least one animal can pass to enter the enclosure. A gate, movable between an open position and a closed position, is positioned therein the at least one opening and can be selectively moved from the open position to the closed position when desired. Methods are also provided for capturing at least one animal by providing a trap with a gate, positioning the gate in an open position, monitoring the trap until at least one animal has entered the trap, and remotely triggering the gate to move from the open position to a closed position.

19 Claims, 14 Drawing Sheets

(56) References Cited

OTHER PUBLICATIONS

Wireless Traps (http://www.wirelesstraps.com/index.html), 2 pages, accessed Sep. 6, 2012.

Feral Hog Solutions (http://feralhogsolutions.net/), 3 pages, accessed Sep. 6, 2012.

* cited by examiner

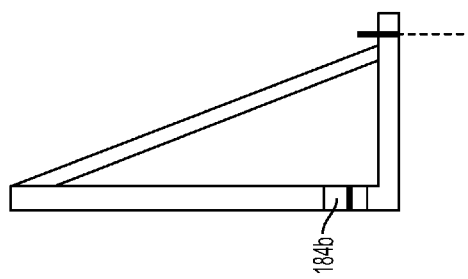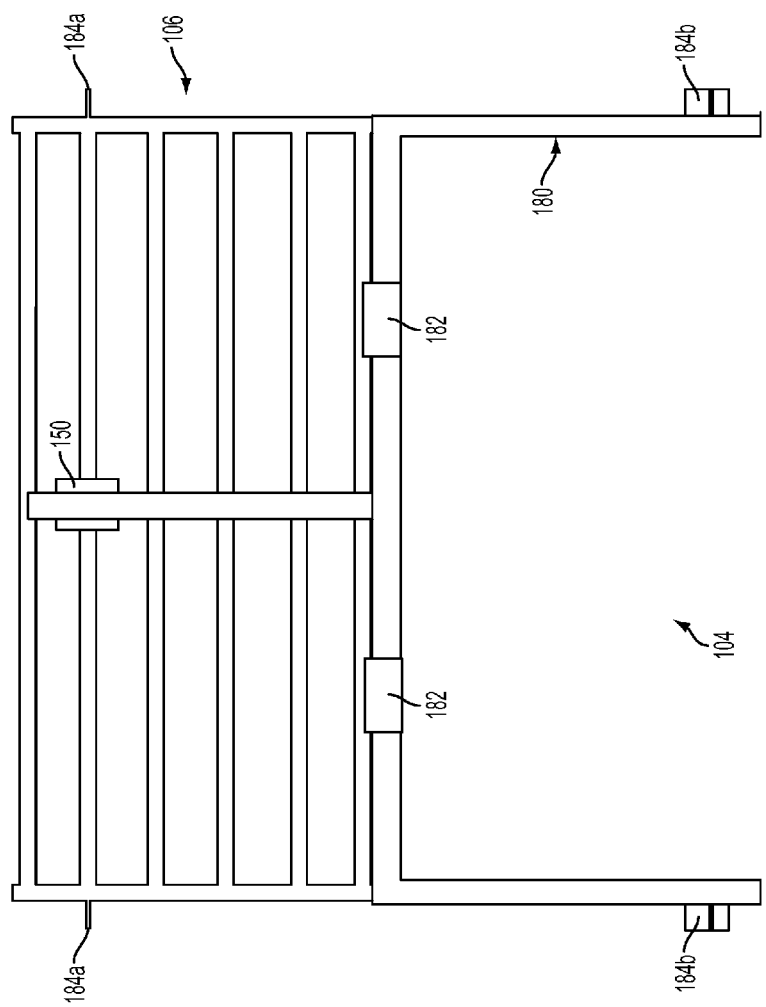

REMOTE CONTROL GATE RELEASE FOR TRAP ENCLOSURE

CROSS REFERENCE TO RELATED APPLICATIONS

This application claims the benefit of and priority to U.S. Provisional Patent Application Ser. No. 61/293,864, filed Jan. 11, 2010, which application is hereby incorporated by reference in its entirety.

FIELD OF THE INVENTION

Provided are traps for trapping a at least one animal. More specifically, traps are provided for remotely trapping nuisance wildlife such as rats, feral pigs, and the like.

BACKGROUND

Animal overpopulation and expensive crop damage have become a serious problem in many rural, suburban and urban areas. One example of this problem is the feral pig population explosion currently affecting farmers and land owners in at least 39 states. Conventional gates on trap enclosures are typically designed to be triggered and closed when an animal enters into the trap enclosure, or is otherwise sensed inside the trap enclosure. However, where high populations of nuisance animals are present, this method often produces low volume capture numbers and future trap avoidance by non-captured animals.

Thus, there is a need in the art for trap enclosures and methods for trapping animals that provide high-volume capture of nuisance animals.

SUMMARY

In accordance with the purposes of this invention, as embodied and broadly described herein, in one aspect, a trap for capturing at least one animal is provided, according to one aspect. In another aspect, the trap can comprise an enclosure having at least one opening through which the at least one animal can pass. In another aspect, a gate, movable between an open position and a closed position, can be positioned therein the at least one opening. In still another aspect, the trap can comprise means for remotely selectively triggering the gate to move the gate from the open position to the closed position when a desired condition has been met.

According to other aspects, methods are provided for capturing at least one animal. A trap can be provided comprising an enclosure having an opening through which at least one animal can pass, a gate positioned in the opening that can be movable between an open position and a closed position, a transmitter configured to transmit a signal, and a remote control mechanism comprising a receiver configured to receive the signal from the transmitter. The remote control mechanism can be configured to move the gate from the open position to the closed position in response to the received signal. Exemplary methods can further comprise positioning the gate in the open position, monitoring the trap until at least one animal has entered the trap, and remotely triggering the gate to move from the open position to the closed position.

Additional advantages will be set forth in part in the description which follows, and in part will be obvious from the description, or may be learned by practice of the aspects of the invention as described herein. The advantages can be realized and attained by means of the elements and combinations particularly pointed out in the appended claims. It is to be understood that both the foregoing general description and the following detailed description are exemplary and explanatory only and are not restrictive of the aspects of the invention, as claimed.

BRIEF DESCRIPTION OF THE DRAWINGS

The accompanying drawings, which are incorporated in and constitute a part of this specification, illustrate aspects of the invention and, together with the description, serve to explain the principles of the invention.

FIG. 12A illustrates a front view of an exemplary gate and gate support frame of a trap, according to another aspect.

FIG. 12B illustrates a side view of the exemplary gate support frame of FIG. 12A.

DETAILED DESCRIPTION

Aspects of the present invention may be understood more readily by reference to the following detailed description, examples, drawings, and claims, and their previous and following description. However, before the present devices, systems, and/or methods are disclosed and described, it is to be understood that aspects of this invention are not limited to the specific devices, systems, and/or methods disclosed unless otherwise specified, as such can, of course, vary. It is also to be understood that the terminology used herein is for the purpose of describing particular aspects only and is not intended to be limiting.

As used in the specification and the appended claims, the singular forms "a," "an" and "the" include plural referents unless the context clearly dictates otherwise. Thus, for example, reference to an "animal" can include two or more such animals unless the context indicates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Reference will now be made in detail to the present preferred aspect(s) of the invention, examples of which are illustrated in the accompanying drawings. Wherever possible, the same reference numbers are used throughout the drawings to refer to the same or like parts.

Figure 1:
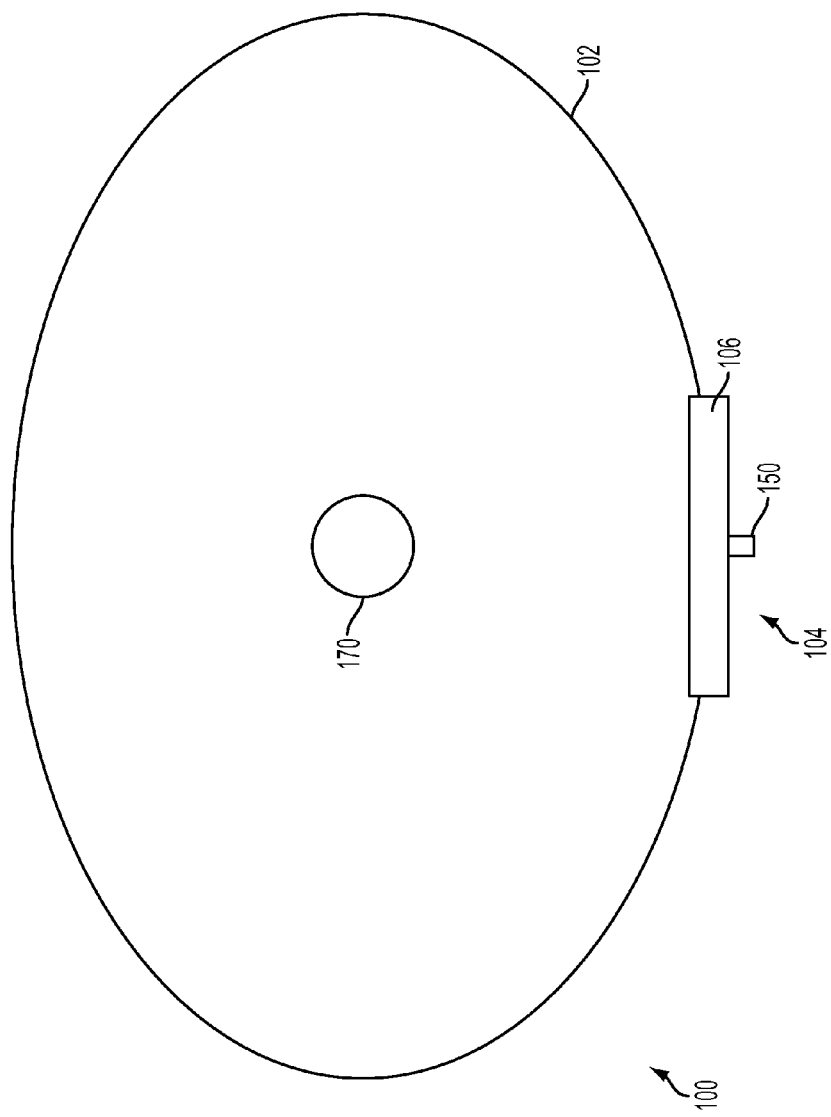
FIG. 1 is a top plan view of an exemplary trap, according to one aspect.
Figure 2:
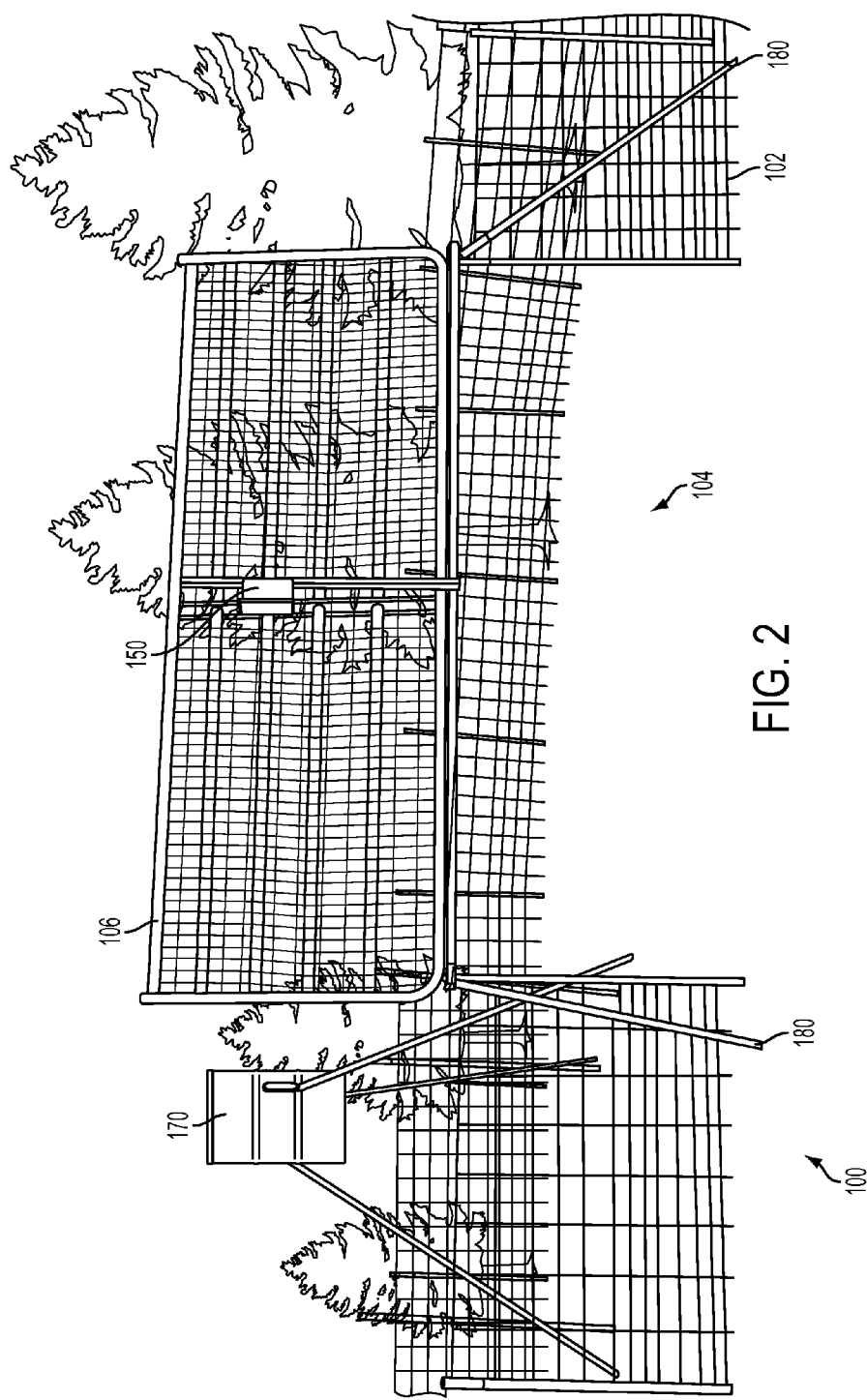
FIG. 2 illustrates an exemplary trap, showing a gate of the trap in an open position, according to one aspect.

In one aspect, a trap 100 is provided for capturing a plurality of animals. Although used herein to describe the capture of feral pigs, it is contemplated that the traps described herein can be used to trap any animal (or a variety of animals). As shown in FIGS. 1 and 2, for example, the trap, in one aspect, can comprise an enclosure 102 having at least one opening 104 through which the plurality of animals can pass. In one aspect, the enclosure can be substantially circular, though other shapes, such as substantially triangular, substantially square, substantially rectangular, and the like are contemplated. In one aspect, a circular or generally rounded trap (i.e., elliptical, rectangular with rounded corners, etc.) can provide a large trap area while avoiding corners in which trapped animals will pile up. A rounded trap can also provide for good flow of animals inside the trap. In still another aspect, the enclosure can be irregularly shaped.

In another aspect, the enclosure can be a relatively large enclosure such that the plurality of animals does not feel confined either entering or loitering in the relatively large area of the enclosure. For example, the enclosure can have an area of at least about 5 feet$^2$, 10 feet$^2$, 20 feet$^2$, 30 feet$^2$, 40 feet$^2$, 50 feet$^2$, 100 feet$^2$, 200 feet$^2$, 500 feet$^2$, 1000 feet$^2$, 1500 feet$^2$, 2000 feet$^2$, 3000 feet$^2$, 4000 feet$^2$, 5000 feet$^2$, 10,000 feet$^2$, 20,000 feet$^2$, 30,000 feet$^2$, 40,000 feet$^2$, 1 acre, 2 acres, 3 acres, 4 acres, 5 acres and greater than 5 acres. In another aspect, the at least one opening can be sufficiently sized such that animal(s) does not feel confined entering the at least one opening. For example, the at least one opening can have a width of at least about 1 foot, 2 feet, 3 feet, 4 feet, 5 feet, 6 feet 7 feet, 8 feet, 9 feet, 10 feet, 11 feet, 12 feet, 13 feet, 14 feet, 15 feet and greater than 15 feet. In one particular aspect, the at least one opening can be approximately 12 feet wide.

In one aspect, the trap can comprise a door or gate 106 positioned in the at least one opening of the enclosure, such as shown in FIGS. 1 and 2. The terms "door" and "gate" are used interchangeably herein. The gate can be movable between an open position (such as shown in FIGS. 2 and 12A) and a closed position. In another aspect, the trap can also comprise means for remotely triggering the gate to move the gate from the open position to the closed position. According to various aspects, and as described further herein below, it is contemplated that the exemplary traps described herein can be left open for a period of time, and the gate can be remotely triggered at a time when it is determined that a desired number of animals will be trapped therein the enclosure.

Figure 3:
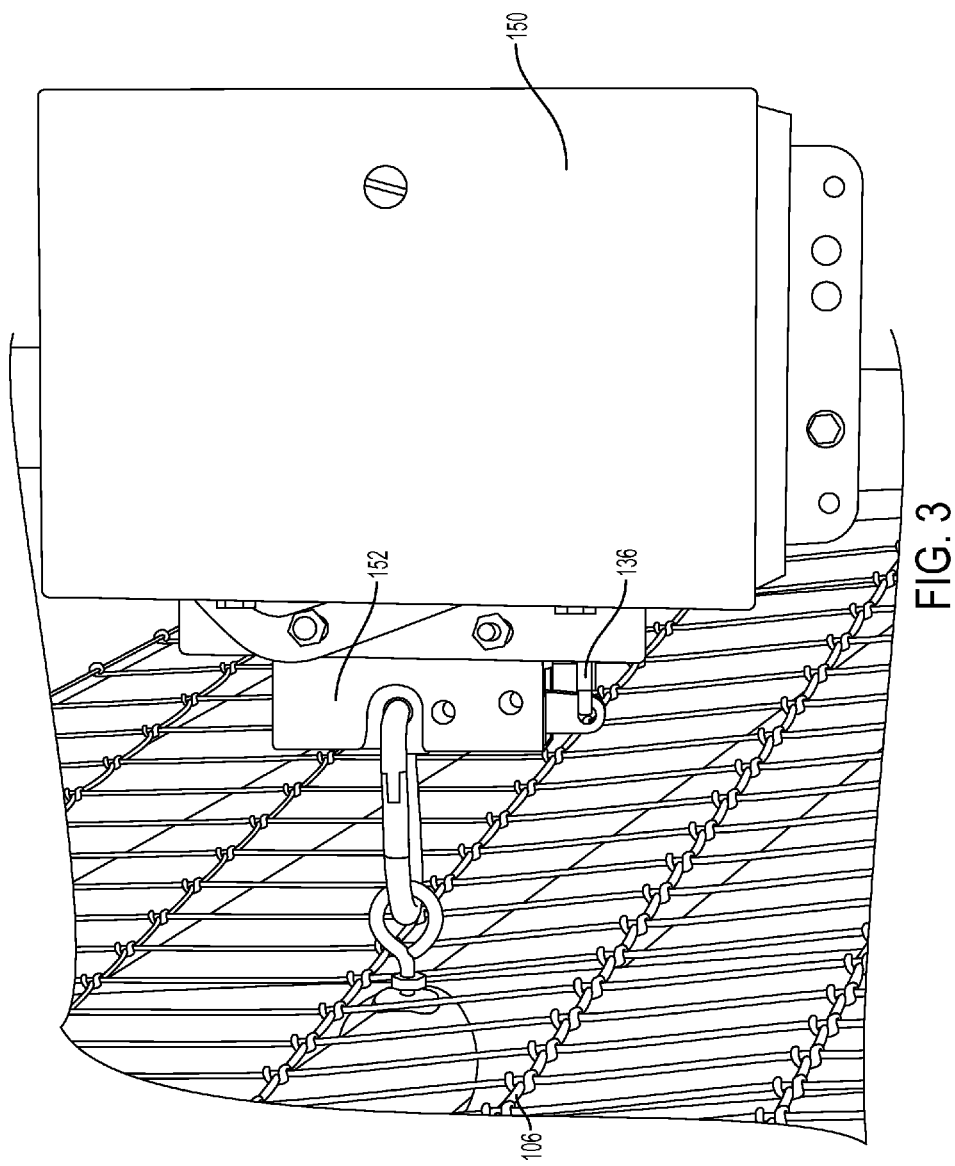
FIG. 3 illustrates a housing and gate release mechanism in use on a trap, according to one aspect.
Figure 4:
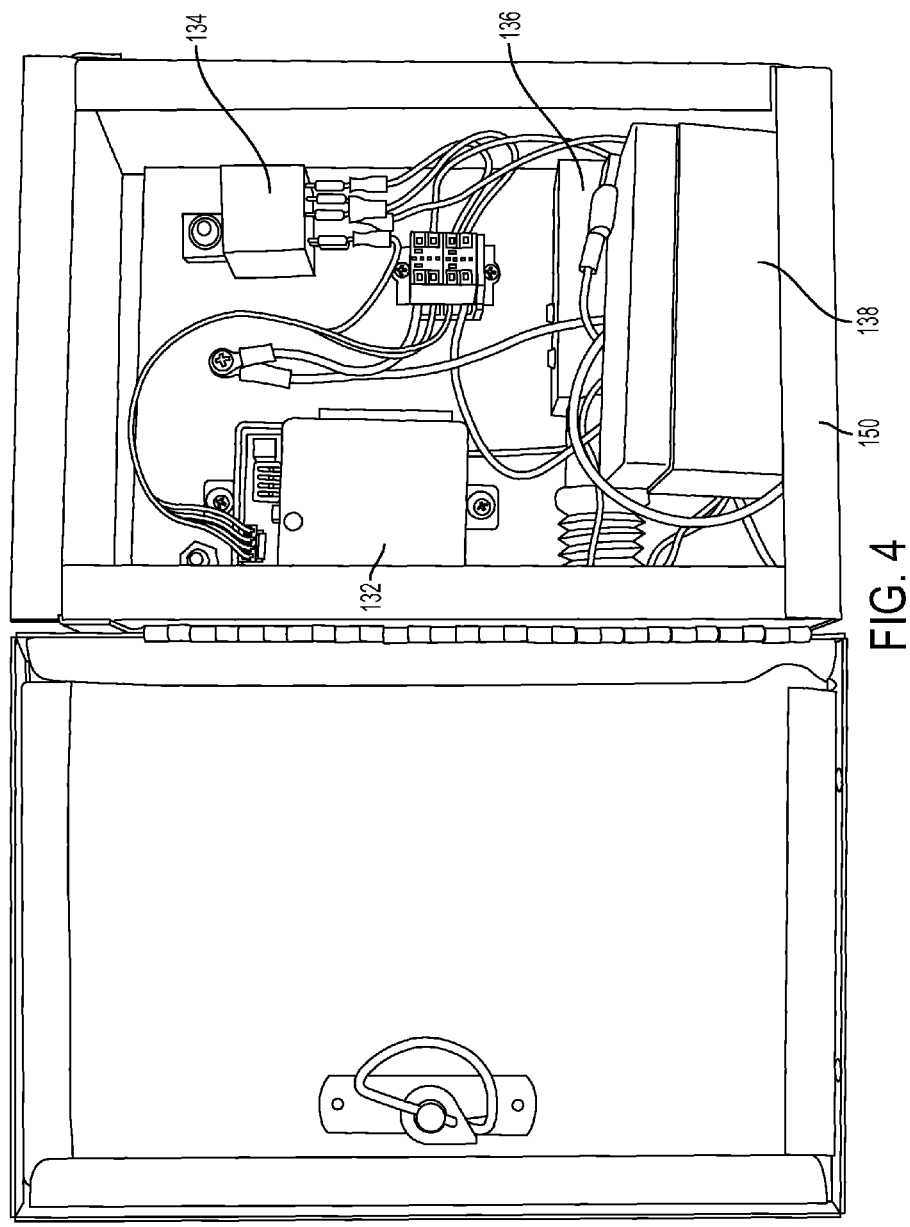
FIG. 4 is front internal view of a housing and gate release mechanism of a trap of the present application, according to one aspect.
Figure 9:
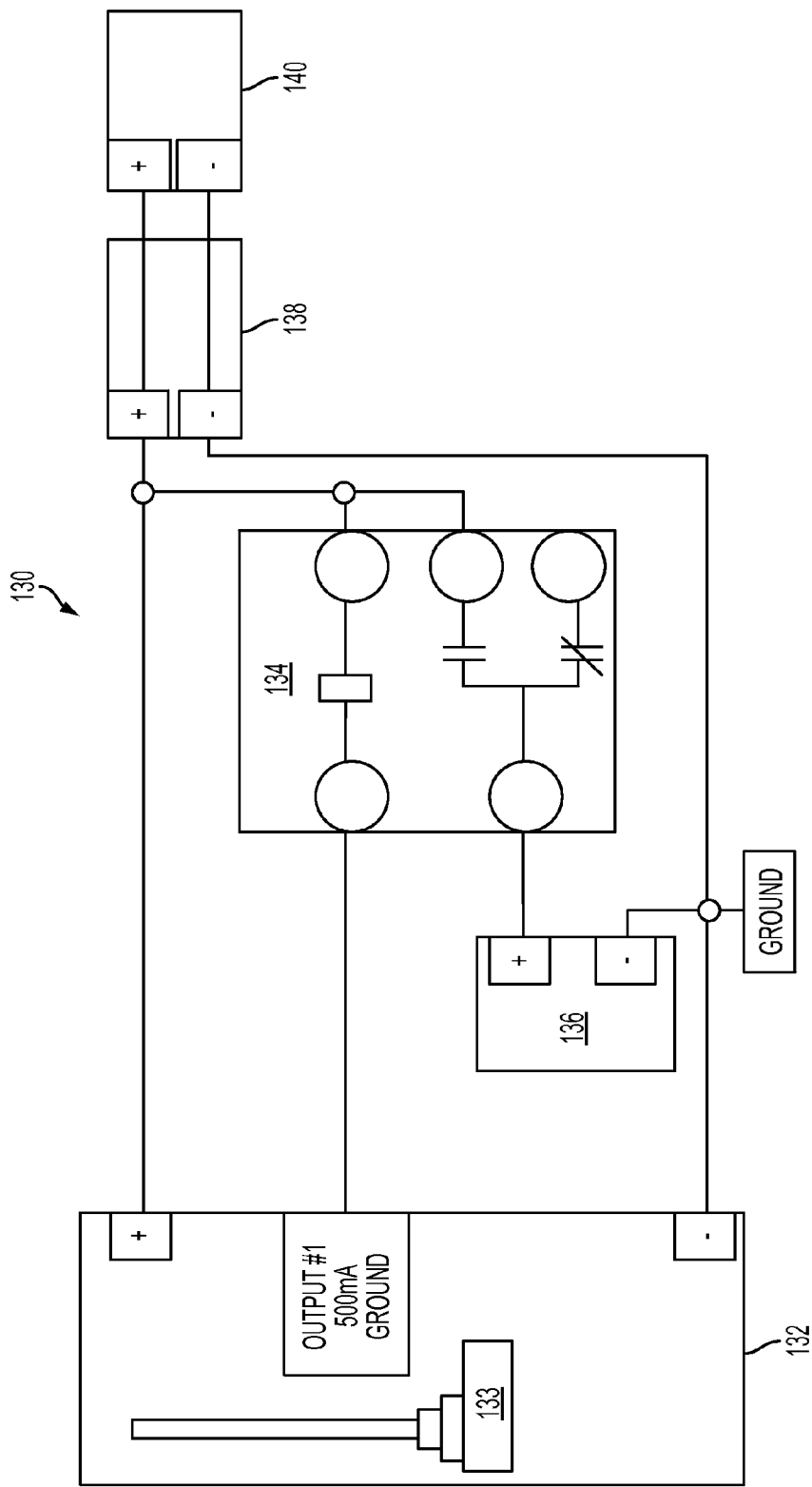
FIG. 9 is a schematic diagram of exemplary means for remotely triggering a gate of a trap, according to one aspect.

In one aspect, a transmitter 120 and remote control mechanism 130 are provided for remotely triggering the gate. The transmitter can be configured to transmit a signal, and the remote control mechanism can be configured to receive the signal from the transmitter. In one aspect, at least a portion of the remote control mechanism 130 can be housed in a housing 150, such as shown in FIGS. 3 and 4. In one aspect, the housing can be a weatherproof housing. The remote control mechanism 130 can comprise a receiver 132 configured to receive the signal from the transmitter (such as wirelessly via the antenna 133), and can be configured to move the gate from the open position to the closed position in response to the received signal. According to another aspect, as shown in FIG. 9 for example, the remote control mechanism can comprise a relay 134 electrically coupled to the receiver 132, a solenoid 136, and a battery 138 or other power source. In another aspect, a solar charger 140 can be provided to charge the battery 138 or other power source. According to one particular aspect, for example, the remote control mechanism can comprise a relay, such as a 30 amp relay and the like, a battery source, such as a 12 volt, 1.4 amp direct current battery source and the like, and a push/pull solenoid or the like.

Figure 8:
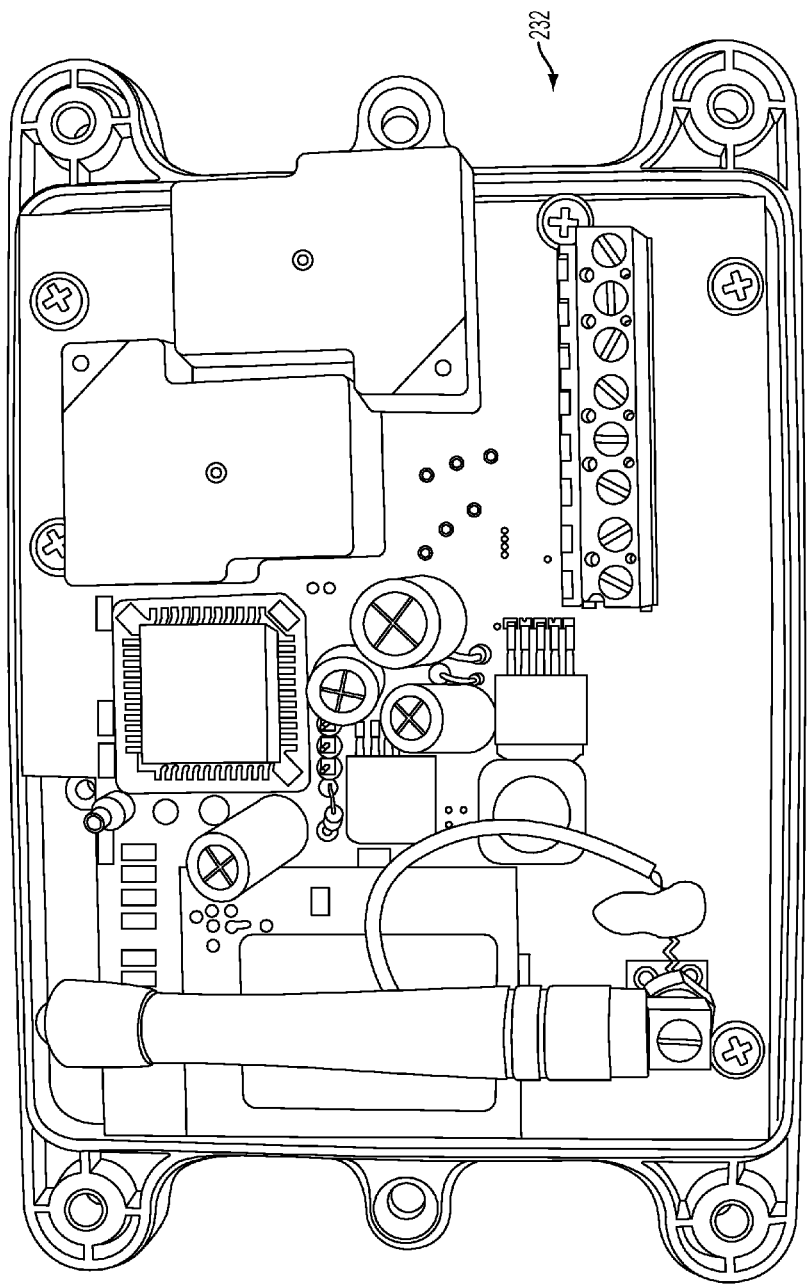
FIG. 8 illustrates the circuit board of a cell phone controller, according to one aspect.
Figure 10:
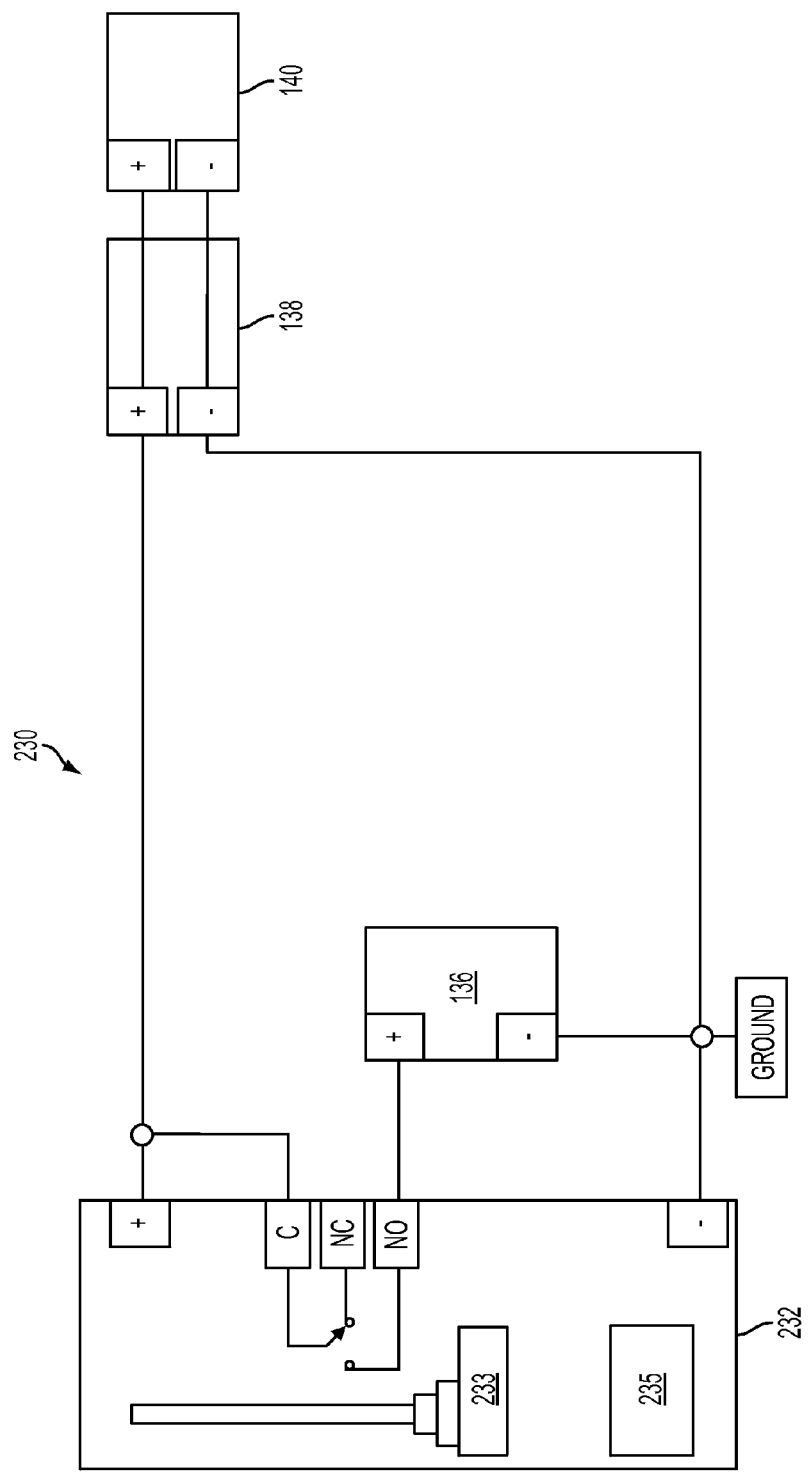
FIG. 10 is a schematic diagram of exemplary means for remotely triggering a gate of a trap using a cell phone controller, according to another aspect.

According to another aspect, a remote control mechanism 230 can be provided for remotely triggering the gate with the use of a cellular telephone ("cell phone") as a transmitter, and a cell phone controller 232 acting as a receiver, such as shown in FIG. 10. The cell phone controller 232 can comprise a wireless remote control on/off switch, and can be configured to move the gate from the open position to the closed position in response to a phone call. As shown in FIG. 10, for example, the cell phone controller can comprise a relay electrically coupled to a solenoid 136 and a battery 138. As discussed above, a solar charger 140 can be provided to charge the battery 138 (or other power source). According to one particular aspect, for example, the cell phone controller 232 can comprise an antenna 233 and a SIM card holder 235 and the like. An exemplary cell phone controller circuit board is shown in FIG. 8.

In another aspect, such as shown in FIG. 4, the remote control mechanism 130 can also comprise a gate release mechanism 152 operatively coupled to the solenoid. In this aspect, the gate release mechanism can be configured to maintain the gate 106 of the enclosure in a desired position, such as the open position so that the at least one animal can enter the enclosure. In another aspect, the gate release mechanism can be a latch, an arm, a hook, a catch, and the like. As shown in FIGS. 3 and 4, the solenoid 136 can extend out of the housing to control the gate release mechanism 152. As can be appreciated, the gate 106 can be supported by a support frame 180, as shown in FIGS. 12A and 12B. The support frame can be constructed from a variety of materials, including but not limited to steel. The gate can be supported by the support frame by one or more hinges 182, which can allow the gate to pivot from the open position to the closed position. As can be appreciated, according to another aspect, the gate can be slidable along or within the frame from the open position to the closed position.

Figure 12C:
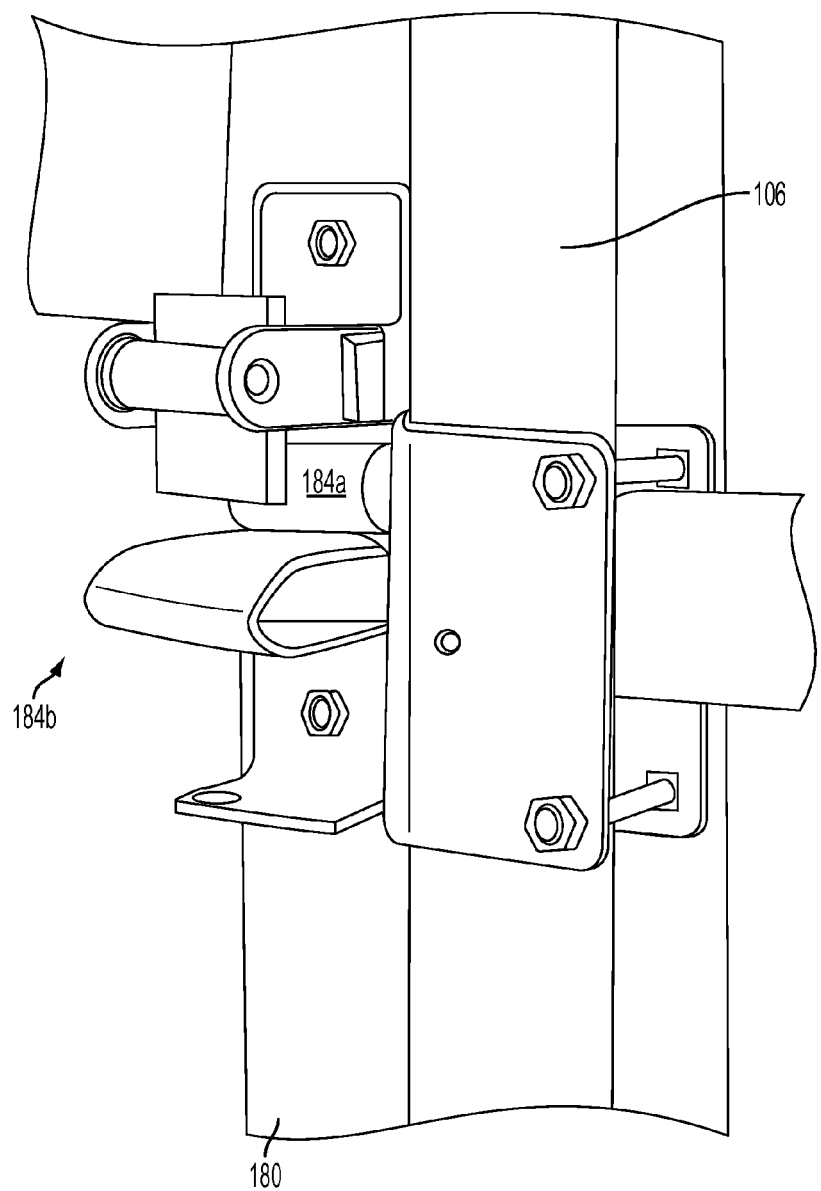
FIG. 12C illustrates a locking mechanism for the gate and gate support frame of FIG. 12A.

According to a further aspect, such as shown in FIGS. 12A-12C, a locking mechanism can be provided on the gate and the gate support frame to maintain or secure the gate in the closed position in order to prevent animals from escaping the trap. As shown in FIGS. 12A-12C, the locking mechanism can comprise a pin or other protrusion 184a on the gate, which cooperates with a latch 184b that is affixed to the gate support frame. As can be appreciated, when the gate is moved to the closed position, the pin or other protrusion 184a can be securely received by the latch 184*b* (as shown in FIG. 12C). As can be appreciated, the pin can be manually released from the latch when desired by a user, such as to release one or more of the animals, or to reopen the gate for further capture of animals. Other conventional locking means can, of course, be used to secure the gate in the closed position.

In operation, when the receiver 132 receives a signal from the transmitter 120, the receiver activates an output signal. In one aspect, the output signal can be activated as long as the transmitter is transmitting a signal to the receiver. In one aspect, the output signal from the receiver can be received by the relay 134, causing the relay to close, thereby sending a signal to the solenoid 136. The solenoid can trigger the gate release mechanism 152 to move the gate from the open position to the closed position. In one non-limiting example, in operation, when the receiver receives a signal from the transmitter, the receiver supplies a 500 mA negative ground to the 30 amp relay. The relay closes sending a 12 volt direct current output to the push/pull solenoid, which triggers the gate release mechanism to move the gate from the open position to the closed position.

According to another aspect, a cell phone controller 232 can receive a signal from a transmitter. The cell phone controller can be activated by a signal from its programmed cell phone number. In one aspect, the cell phone controller will reject the call without answering, while closing the normally open contacts, thereby sending a signal to the solenoid 136. The solenoid 136 triggers the gate release mechanism to move the gate from the open position to the closed position.

Figure 5:
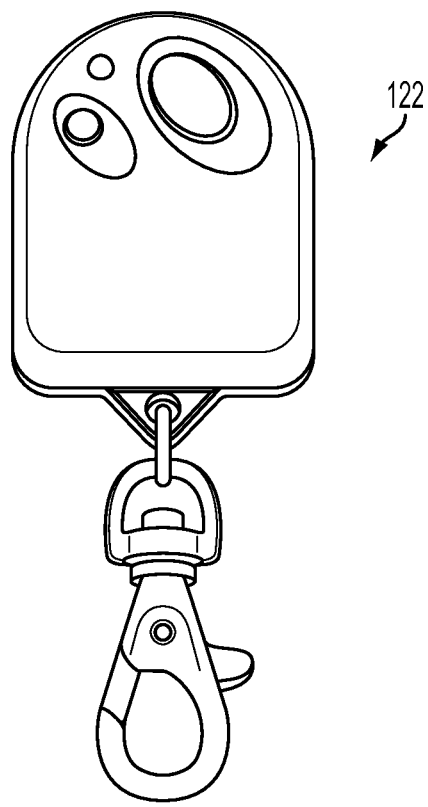
FIG. 5 illustrates a hand-held, push button-activated wireless transmitter, according to one aspect.
Figure 6:
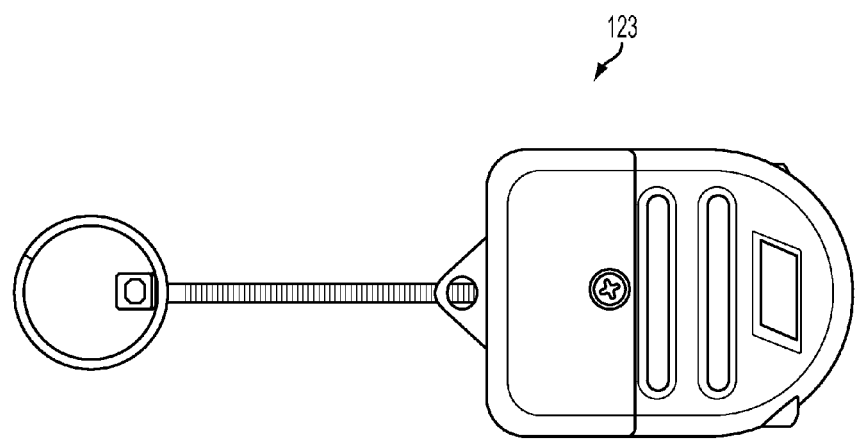
FIG. 6 illustrates a trip wire, pull pin-activated wireless transmitter, according to one aspect.
Figure 7:
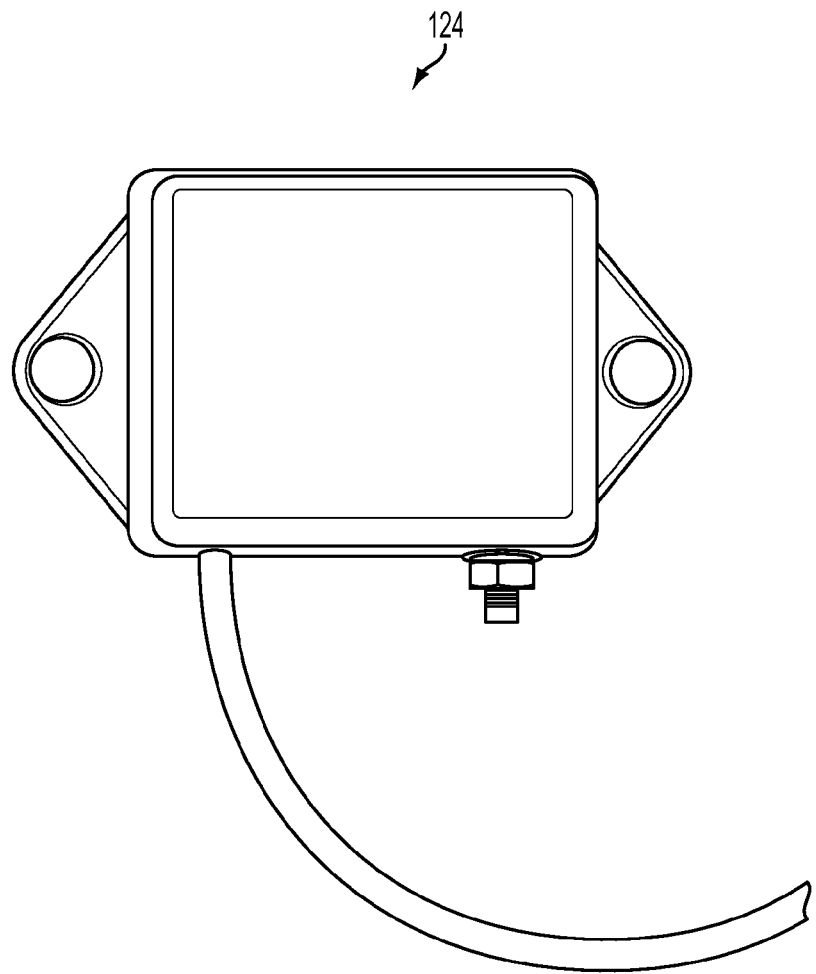
FIG. 7 illustrates a motion sensor-activated wireless transmitter, according to one aspect.

According to various aspects, the transmitter 120 can be configured for wireless communication with the receiver. Thus, in one aspect, the transmitter can be any device capable of transmitting a wireless signal to—or otherwise being in wireless communication with—the receiver. The transmitter can be a hand-held, push button-activated wireless transmitter such as a key fob 122 (as exemplarily shown in FIG. 5), a pull pin-activated wireless transmitter 123 (as exemplarily shown in FIG. 6), a motion sensor-activated wireless transmitter 124 (as exemplarily shown in FIG. 7), a remote control, a cellular telephone, or other such device. As can be appreciated, if a key fob 122 is used as a transmitter, a user can press a button on the key fob when the user desires to close the gate of the trap. In another aspect, a trip wire can be installed within the trap; when an animal touches the trip wire, it will cause the pull pin in the pull pin-activated wireless transmitter 123 to be pulled, causing a wireless signal to be transmitted to the receiver to close the gate (as discussed above). In one aspect, such a trip wire can be positioned in the trap at a distance from the gate, such that it will not be tripped until one or more animals are well within the trap when the gate is moved from the open to the closed position. According to other aspects, the transmitter can be configured for wired communication with the receiver.

The trap can also comprise means for detecting the presence of at least one animal therein the enclosure. For example, and not meant to be limiting, a camera can be provided in the enclosure, or near the enclosure, and can be configured to record or sense the presence of the at least one animal therein the enclosure. In one aspect, the camera can be a closed-circuit device or an internet protocol (IP) web camera intended to continuously broadcast a transmission to a closed circuit television or other monitoring device, such as, for example, an IP web camera network. In another aspect, the camera can also be an infrared camera, configured to record the thermal image of the at least one animal therein the enclosure. In still another aspect, the camera can be a night vision camera configured to record the image of the at least one animal therein the enclosure. Such exemplary means for detecting the presence of the at least one animal can be configured to record still or moving images to any suitable computer-readable storage medium including hard disks, CD-ROMs, optical storage devices, or magnetic storage devices or to other recording devices (such as video tape recorder). In another aspect, the means for detecting the presence of the at least one animal can be configured to transmit the recorded images to a remote display device, such as a monitor.

Figure 11A:
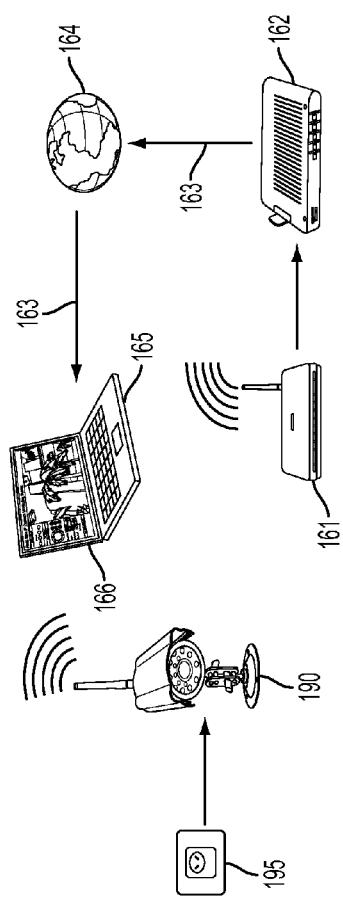
FIG. 11A is a schematic diagram of an internet protocol (IP) web camera network and installation for offsite monitoring and control of a trap, according to one aspect.
Figure 11D:
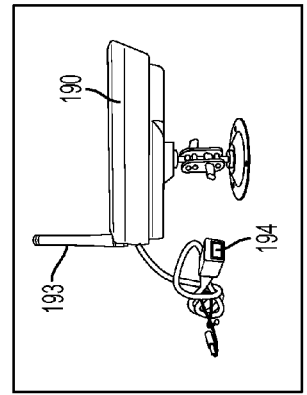
FIG. 11D is a side view of the exemplary infrared camera of FIG. 11A.
Figure 11C:
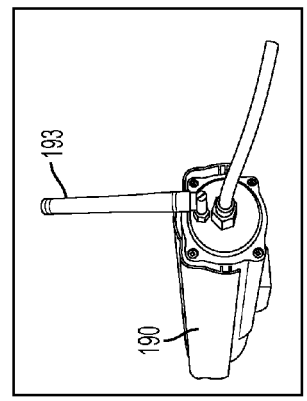
FIG. 11C is a rear view of the exemplary infrared camera of FIG. 11B.
Figure 11B:
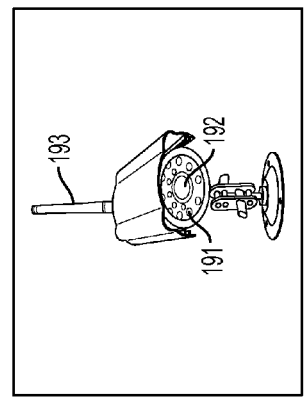
FIG. 11B is a front view of an exemplary infrared camera of the IP web camera network of FIG. 11A.
Figure 11E:
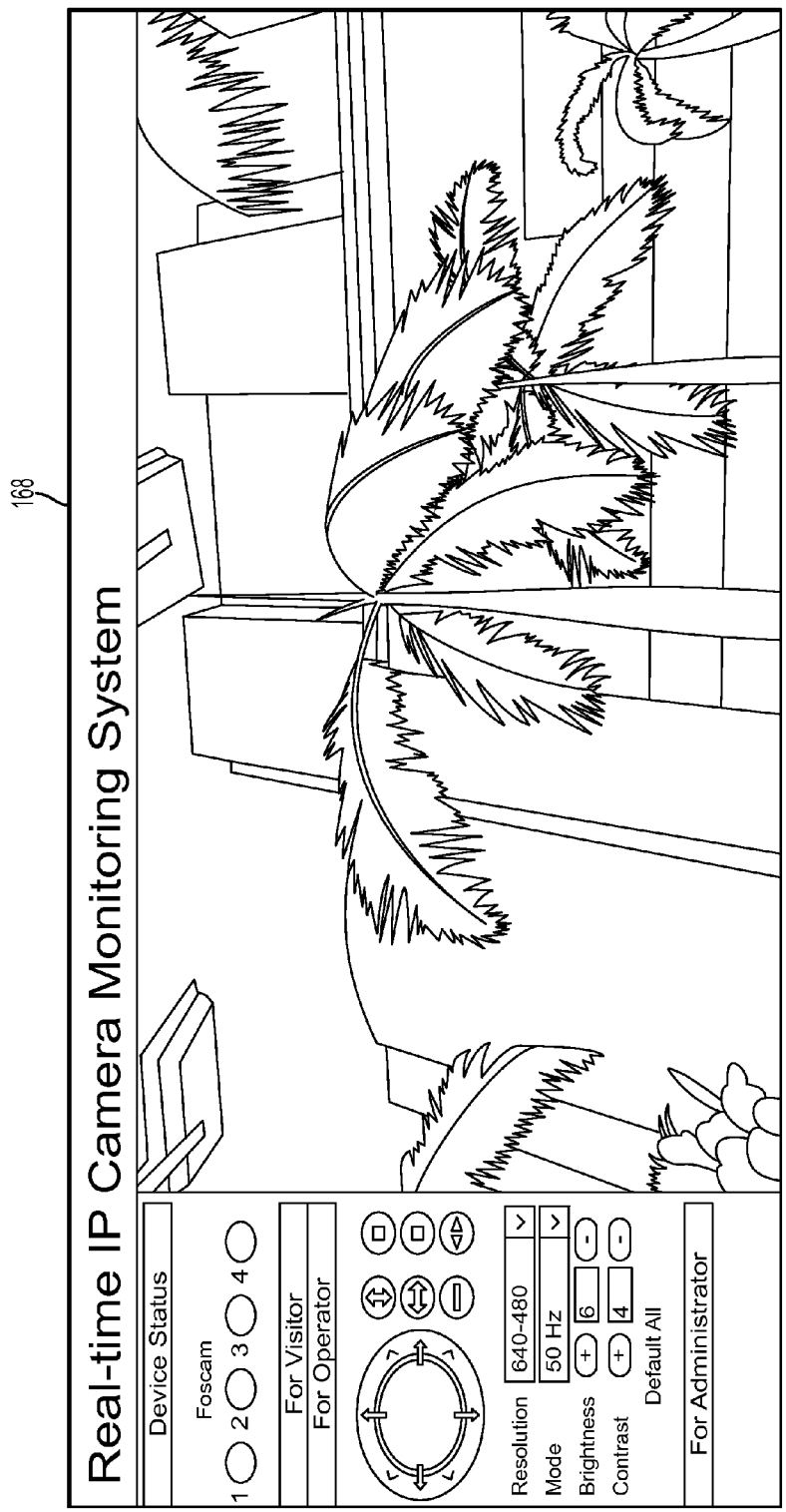
FIG. 11E illustrates an exemplary user interface of the IP web camera network of FIG. 11A.

In one aspect, such as shown in FIGS. 11A-11E, a camera 190 can be provided as part of an IP web camera network. The infrared camera can have infrared or LED lights 191, a lens 192, and an antenna 193 configured for wireless transmission. The camera can also have a power source 195, such as a direct current power source, and can have an RJ45 port 194, as shown in FIG. 11D. The camera can transmit its images to a computer via a conventional wireless internet system, which can include a wireless router 161 and a modem 162, which transmit information via the internet to a computer 165 that has a display device, such as a monitor 166. As can be appreciated, the modem and computer can be in communication with the internet 164 via network cables 163 or other conventional means. Of course, other means of transmitting the camera image(s) to a computer or other display device are contemplated, and are not limited to the wireless network shown in FIG. 11A. According to another aspect, the camera can transmit image(s) to a wireless handheld device, such as a cellular telephone, personal digital assistant (PDA), or other such device. Any such device having means of displaying the images to a user can include a user interface 168 (shown in FIG. 11E), which can allow the user to adjust the image (e.g., brightness, contrast), and can also allow the user to manipulate the camera wirelessly (e.g., by panning and/or zooming the camera to capture different images).

In another aspect, the means for detecting the presence of the at least one animal can be configured or otherwise programmed to automatically trigger the gate when a predetermined condition has been met. In various aspects, the predetermined condition can be a certain date and/or time, a predetermined level of food remaining in a food dispensing mechanism (described further below), a predetermined number of animals detected in the enclosure by the camera or a local person, and the like.

According to yet other exemplary aspects, as shown for example in FIG. 2, the trap can comprise a food dispensing mechanism 170, such as but not limited to a substantially automatic food dispensing mechanism. The food dispensing mechanism can be positioned therein the enclosure 102 and can be configured to provide food to at least one animal in the enclosure. In one aspect, the food dispensing mechanism 170 can be positioned substantially centrally within the enclosure. In other aspects, however, the food dispensing mechanism can be positioned at any location within the enclosure. In one aspect, the food dispensing mechanism can provide food at a predetermined time or at predetermined intervals (such as every twelve hours, daily, nightly, etc.). The food dispensing mechanism can be used, for example, to lure animals into the enclosure. The enclosure can be left open for selected periods of time (such as hours, days, weeks, etc.) prior to the capture of animals. The use of an automatic feeder can allow the animals to come and go into the enclosure and come to trust the enclosure as a food source area. Additionally, the use of an automatic or substantially automatic food dispensing mechanism 170 allows the scent of humans around the trap to be minimized or eliminated, thereby minimizing the chances that animals will avoid entering the trap.

Repeated use of the enclosure by the animals over several days or weeks can allow the animals to recruit other animals to the area for higher volume trapping results. For example, feral pigs are known to travel in packs and groups. As more pigs are drawn to the enclosure as a food source, they will travel outside of the enclosure to recruit more pigs to enter the enclosure. The enclosure can be monitored (such as locally, or remotely via the means for detecting the presence of an animal therein the enclosure), until such time as it is desired to close the gate to the enclosure, thereby trapping animals inside of the enclosure.

According to one aspect, it is contemplated that the animals trapped inside of the enclosure can be removed from the enclosure and disposed of according to conventional means. In one aspect, for example when the trap is used to trap feral pigs, one or more pigs (hereinafter, a "Judas pig") can be kept alive and can be used to track the location of other groups of feral pigs. For example, such a Judas pig can be tagged with a radio telemetry device and can be released. The Judas pig will naturally migrate to other groups of feral pigs. When the location of other groups of feral pigs is determined, a new trap, such as described above, can be set up to capture the new group of pigs. In one aspect, it is contemplated to use a female adult or sub-adult feral pig as the Judas pig.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A trap for capturing a plurality of animals comprising:
    an enclosure having at least one opening through which at least one animal of the plurality of animals can pass;
    a gate positioned therein the at least one opening, wherein the gate is movable between an open position and a closed position;
    an automatic food dispensing mechanism positioned therein the enclosure and configured to selectively provide food to at least one animal of the plurality of animals therein the enclosure, wherein the automatic food dispensing mechanism provides food at a predetermined time or at predetermined time intervals;
    means for remotely actuating the gate to move the gate from the open position to the closed position when a predetermined condition has been met, the means for remotely actuating the gate comprising a transmitter and a remote control mechanism, wherein the predetermined condition comprises at least one of a certain date, a certain time, a predetermined level of food remaining in the automatic food dispensing mechanism, and a predetermined number of animals detected in the enclosure; and
    means for detecting the presence of the plurality of animals therein the enclosure,
    wherein the predetermined number of animals detected in the enclosure is detected by a camera.

2. The trap of claim 1, wherein the transmitter is configured to transmit a signal; wherein the remote control mechanism comprises a receiver configured to receive the signal from the transmitter, and wherein the remote control mechanism is configured to move the gate from the open position to the closed position in response to the received signal.

3. The trap of claim 2, further comprises a weather-proof housing configured to house at least a portion of the remote control mechanism.

4. The trap of claim 2, wherein the transmitter is a key fob.

5. The trap of claim 2, wherein the transmitter is a remote control.

6. The trap of claim 2, wherein the transmitter is a cellular telephone.

7. The trap of claim 2, wherein the transmitter is a motion sensor.

8. The trap of claim 2, wherein the transmitter is configured for wireless communication with the receiver.

9. The trap of claim 2, wherein the receiver is a cell phone controller and is configured to move the gate from the open position to the closed position in response to a received telephone call.

10. The trap of claim 2, wherein the remote control mechanism further comprises:
    a relay in operative communication with the receiver;
    a push/pull solenoid in operative communication with the relay;
    a battery in operative communication with the relay and the receiver; and
    a gate release mechanism,
wherein in response to the received signal from the transmitter, the receiver is configured to send an output signal to the relay, the relay is configured to trigger the battery to send a direct current output to the push/pull solenoid, and the push/pull solenoid is configured to trigger the gate release mechanism to close the gate.

11. The trap of claim 1, wherein the means for detecting the presence of the plurality of animals therein the enclosure comprises an infrared camera.

12. The trap of claim 1, wherein the means for detecting the presence of the plurality of animals therein the enclosure comprises a night vision camera.

13. The trap of claim 1, wherein the means for detecting the presence of the plurality of animals therein the enclosure comprises a thermal imaging camera.

14. The trap of claim 1, wherein the means for detecting the presence of the plurality of animals therein the enclosure comprises an internet protocol web camera.

15. The trap of claim 1, wherein the means for remotely actuating the gate is held in the open position until the predetermined level of food is remaining in the automatic food dispensing mechanism.

16. The trap of claim 1, wherein the predetermined number of animals detected in the enclosure is detected by a person.

17. A method for capturing a plurality of animal, comprising:
    providing a trap comprising:
        an enclosure having at least one opening through which at least one animal of the plurality of animals can pass;
        a gate positioned therein the at least one opening, wherein the gate is movable between an open position and a closed position;
        an automatic food dispensing mechanism positioned therein the enclosure and configured to selectively provide food to at least one animal of the plurality of animals therein the enclosure, wherein the automatic food dispensing mechanism provides food at a predetermined time or at predetermined time intervals:
        a transmitter configured to transmit a signal; and
        a remote control mechanism comprising a receiver configured to receive the signal from the transmitter, wherein the remote control mechanism is configured to move the gate from the open position to the closed position in response to the received signal;

positioning the gate in the open position;

monitoring the trap with a camera until a predetermined condition has been met, wherein the predetermined condition comprises at least one of a certain date, a certain time, a predetermined level of food remaining in the automatic food dispensing mechanism, and a predetermined number of animals detected in the enclosure; and remotely triggering the gate to move from the open position to the closed position upon the meeting of the predetermined condition.

18. The method of claim 17, wherein remotely triggering the gate to move from the open position to the closed position comprises transmitting the signal from the transmitter to the receiver.

19. The method of claim 18, wherein the transmitter is a cellular telephone and the receiver is a cell phone controller, and wherein transmitting the signal comprises sending a telephone call from the cellular telephone to the cell phone controller.

\* \* \* \* \*